US005912880A

United States Patent [19]
Bernstein

[11] Patent Number: 5,912,880
[45] Date of Patent: Jun. 15, 1999

[54] SYSTEM AND METHOD FOR ATM CBR TIMING RECOVERY

[75] Inventor: Greg M. Bernstein, Fremont, Calif.

[73] Assignee: Northern Telecom, Limited

[21] Appl. No.: 08/746,176

[22] Filed: Nov. 7, 1996

[51] Int. Cl.⁶ .................................................. H04L 7/00
[52] U.S. Cl. ........................... 370/252; 370/395; 370/503; 375/327
[58] Field of Search ..................................... 370/391, 394, 370/395, 411, 413, 503, 252, 253, 506, 508; 375/372, 371, 327, 373, 376

[56] References Cited

U.S. PATENT DOCUMENTS

| | | | |
|---|---|---|---|
| 4,961,188 | 10/1990 | Lau .......................................... | 370/517 |
| 5,260,978 | 11/1993 | Fleischer et al. ....................... | 375/354 |
| 5,268,936 | 12/1993 | Bernardy ................................. | 375/376 |
| 5,274,681 | 12/1993 | Yamada et al. ......................... | 375/372 |
| 5,287,182 | 2/1994 | Haskell et al. .......................... | 375/376 |
| 5,367,545 | 11/1994 | Yamashita et al. ..................... | 375/376 |
| 5,396,492 | 3/1995 | Lien ......................................... | 370/412 |
| 5,475,718 | 12/1995 | Rosenkranz ............................ | 375/376 |
| 5,479,457 | 12/1995 | Waters .................................... | 375/376 |
| 5,486,784 | 1/1996 | Eriksson ................................. | 375/372 |
| 5,604,773 | 2/1997 | Urala ....................................... | 375/376 |

FOREIGN PATENT DOCUMENTS 0 394 051  10/1990  European Pat. Off. .

OTHER PUBLICATIONS

Ron A. Spanke and J. Marke Adrian, "ATM Composite Cell Switching for DSO Digital Switches," Apr., 1995, XV International Switching Symposium, vol. 1.

R. Mauger and S. Brueckheimer, "The role of ATM in 64 kb/s Switching and Transmission Networks," Apr., 1995, XV International Switching Symposium, vol. 2.

*Primary Examiner*—Chau Nguyen
*Assistant Examiner*—Ken Vanderpuye
*Attorney, Agent, or Firm*—Finnegan, Henderson, Farabow, Garrett & Dunner, L.L.P.

[57] ABSTRACT

A system in a receiver of ATM cells determines an average cell interarrival time by determining the amount of time required for a predetermined number of cells to arrive. The system then uses the average cell interarrival time to adjust the internal timing of the receiver.

34 Claims, 6 Drawing Sheets

SYSTEM AND METHOD FOR ATM CBR TIMING RECOVERY

BACKGROUND OF THE INVENTION

The present invention relates in general to the field of packet switching networks, and in particular to the field of recovering timing across a packet switching network, such as an Asynchronous Transfer Mode (ATM) network, that transmits fixed length packets or cells.

Certain services to be carried on packet switching network require synchronization between the transmitting source and receiver at a layer in the OSI model above the physical layer, typically the transport or application layers. Examples of these services include voice and video. Some of the services use constant bit rate (CBR) streams carried over a packet switched network. These CBR streams are sequences of packets that contain data generated by a source at a constant bit rate.

The need to recover timing for CBR streams exists to prevent data buffer underflow or overflow in the receiver and thus a loss of data. This synchronization is at a higher layer than the segment-by-segment physical layer timing recovery required of any link in either a packet or circuit switched network.

One technique for recover timing uses a synchronous residue time stamp (SRTS) which U.S. Pat. Nos. 5,260,978 and 4,961,188 describe. The SRTS technique, however, cannot be used unless there is end-to-end physical layer timing synchronization between the source and destination. Many ATM LAN switches do not permit this type of timing distribution, in addition some types of links such as DS-3 carrying ATM also preclude it.

Other techniques seek to derive timing from the packet or ATM layer itself based upon the CBR nature of the packet or cell stream. U.S. Patent Nos. 5,396,492 and 5,287,182 use the fill level of a First In/First Out (FIFO) buffer at the receiver to indicate whether the recovered clock at the receiving end is too fast or too slow. If the FIFO buffer fill level increases, the receiver clock is too slow; if the FIFO buffer fill level decreases, the receiver clock is too fast.

Unfortunately, these techniques suffer major drawbacks. For example, lost cells cause the FIFO fill level to indicate a fast clock even if the clock is synchronized. Also the fill level technique requires several cells to be buffered in order to operate properly, and the time needed to receive all these cells can be large enough to affect the critical delay requirement for some applications, such as PBX like voice networks. Third, buffer overflow or underflow will also adversely affect the operation of such a system, such as results in under or over reporting of clock rate correction.

There is, therefore, a need for a system that recovers timing from CBR cell transmissions without adversely affecting receiver operation or using SRTS techniques. Such a system should, in addition, not be affected by buffer overflows or underflows in a receiver circuit.

SUMMARY OF THE INVENTION

This invention meets those needs by determining the time required to receive a predetermined number of cells. That time can be converted into an average cell interarrival time that can in turn be used to control the receiver's internal timing system.

In particular, a method consistent with this invention of recovering the timing of a CBR packet stream, such as an Asynchronous Transfer Mode (ATM) CBR virtual channel (VC), includes the steps of: detecting, at a receiver, the receipt of a predetermined number of cells (or packets); measuring the internal receiver time elapsed during the receipt of the predetermined number of cells (or packets), the internal receiver time being derived from a timing source in the receiver; and adjusting the timing source according to the measured internal receiver time.

A system consistent with this invention to recover the timing of a CBR packet stream, such as an Asynchronous Transfer mode (ATM) CBR virtual channel (VC), includes means for detecting the receipt of a predetermined number of cells; an internal receiver clock recording internal receiver time; means for measuring the internal receiver time elapsed during the receipt of the predetermined number of cells; and means for adjusting the internal receiver clock according to the measured internal receiver time.

BRIEF DESCRIPTION OF THE DRAWINGS

The accompanying drawings, which are incorporated in and constitute a part of this specification, illustrate embodiments of the invention and, together with the description, explain the objects, advantages, and principles of the invention. In the drawings.

DETAILED DESCRIPTION OF PREFERRED EMBODIMENTS

Reference will now be made to preferred implementations of this invention, examples of which are shown in the accompanying drawings. In those drawings, like reference numbers in different drawings refer to the same elements.

Figure 1:
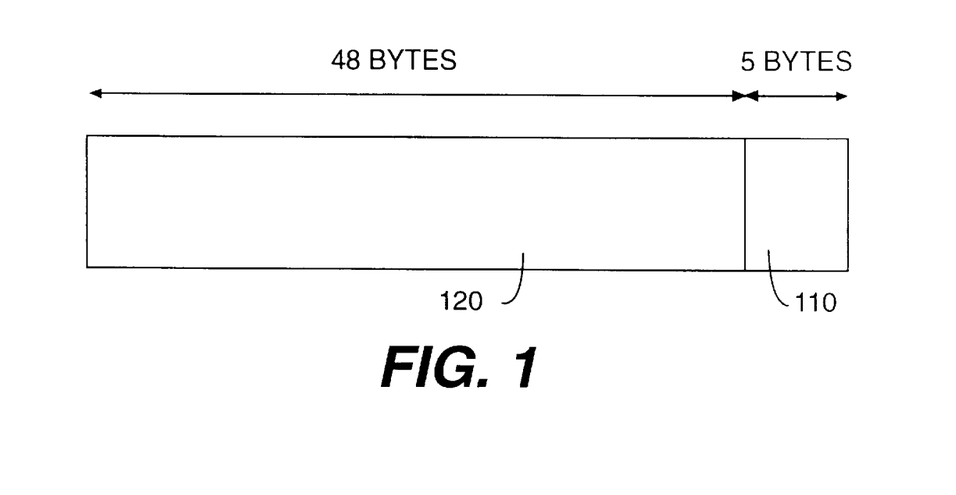
FIG. 1 is a representation of an ATM cell.

The present invention is described with regard to an ATM system, although it need not be limited to such a system. ATM systems transmit 53-byte cells. FIG. 1 shows a diagram of an ATM cell 100 with an five-byte of header and a forty-eight-byte "payload." ATM switches create virtual channels (VCs) to route each cell to its destination, and the header for each cell in the same VC includes a VCI/VPI field identifying the VC. The VPI/VCI field thus allows the preferred implementation of this invention to look only at cells from only one data stream (VC) when controlling a clock for the ATM receiver.

Figure 2:
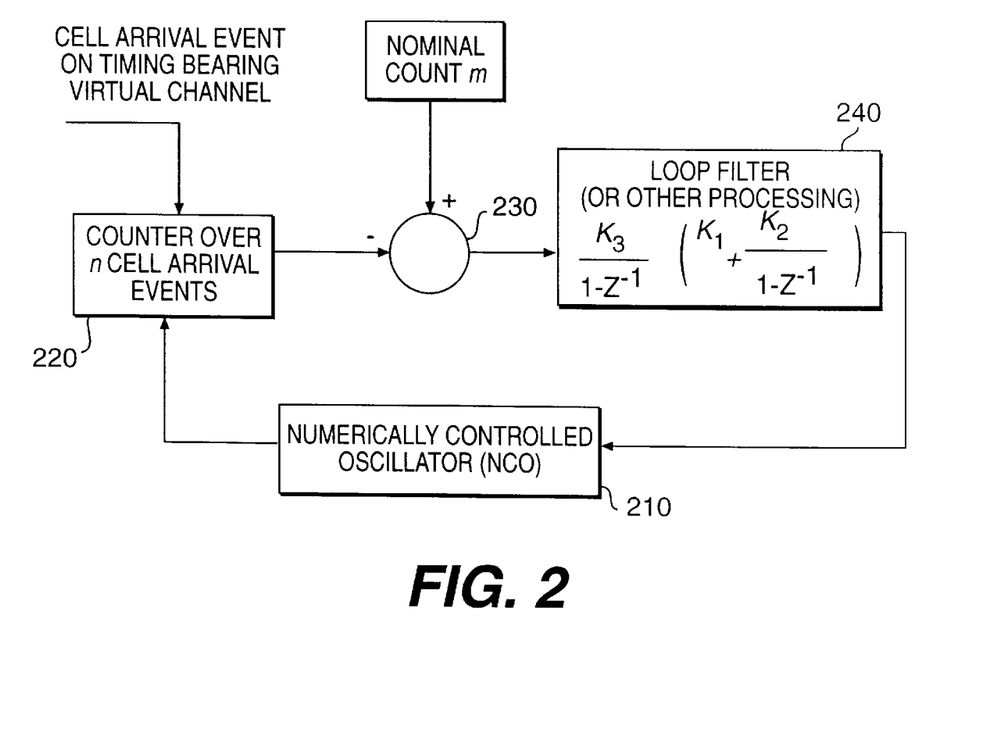
FIG. 2 is a functional block diagram of a technique of recovering timing from a CBR cell stream consistent with this invention.

FIG. 2 is a functional block diagram demonstrating a technique according to the present invention for recovering timing from a CBR stream. Essentially, the invention involves correcting the receiver's clock according to an average cell interarrival time. That time may be derived from the time required to receive a predetermined number of cells.

In FIG. 2, numerically controlled oscillator (NCO) 210 preferably a high-frequency oscillator, drives a counter 220 to measure the interarrival time between n successive cells from a CBR message. The nominal frequency of NCO 210, $f_{NCO}$, is $$(m/n) * f_{source} + (\text{error}),$$

where m is a scaling value and $f_{source}$ is the transmission frequency of the cells.

After n cells arrive on a selected VC, adder 230 subtracts the contents of counter 220 from m to accomplish one level of scaling. Processing circuitry 240 then determines an average cell interarrival time and performs any necessary filtering, scaling and other processing to create the proper signal to correct the value of NCO 210.

Figure 3:
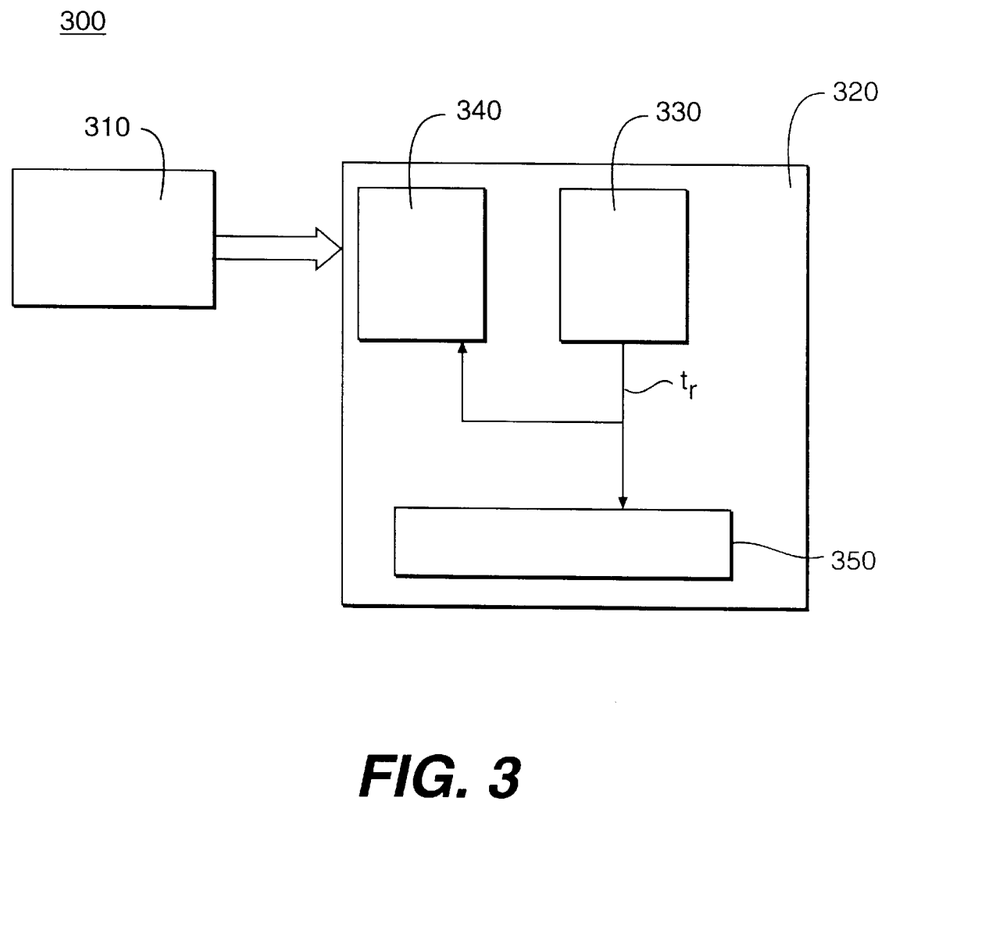
FIG. 3 is a block diagram of a receiver system that uses this invention.

This invention can be used in an ATM transmission system, such as system 300 in FIG. 3. In system 300, transmitter 310 sends CBR cells to receiver 320. Receiver 320 includes a timing section 330 to generate an internal timing signal $t_T$, a receiving section 340 to extract the contents of the cells and buffer them, and a processing section 350 to perform necessary processing, such as error correction, on the cells.

Figure 4:
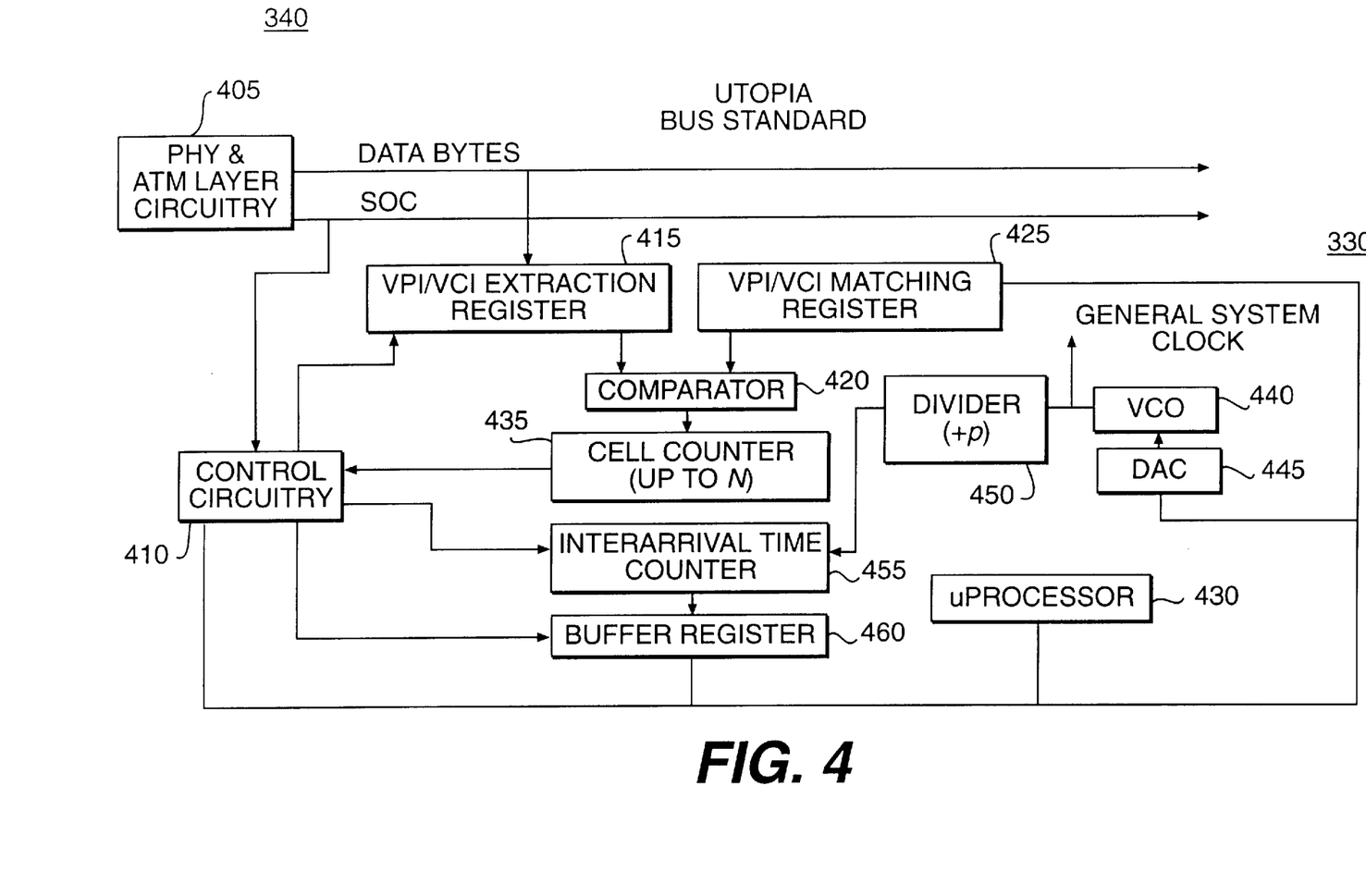
FIG. 4 is a diagram of the timing section in the receiver system of FIG. 3.

FIG. 4 is a more detailed block diagram of portions of extraction section 340 and timing section 330. In extraction section 340, PHY and ATM layer circuitry 405 extracts from the input ATM stream an SOC (start of cell) signal and the data bytes from the cells. PHY and ATM layer circuitry 405 sends the SOC signal to control circuitry 310 and sends the data bytes to the rest of receiver 320 on a bus operating under the UTOPIA standard.

In timing section 330, VPI/VCI extraction register 415 examines header information from the data bytes. In response to control circuitry 410, register 415 extracts the VPI/VCI values for the current ATM cell.

Comparator 420 compares those extracted values to VPI/VCI values microprocessor 430 stored in VPI/VCI matching register 425. In the preferred embodiment, microprocessor 430 stores in register 425 a predetermined VPI/VCI value for a virtual channel carrying a CBR stream. Focusing on cells from only one VC and examining the header filters out, among other things, OA&M (operation, administration, and maintenance) cells that should not be used to correct timing.

When comparator 420 determines that the VPI/VCI values from these two registers match, it sends a count signal to cell counter 435 and through that counter to control circuitry 410. Cell counter 435 keeps track of the number of cells received. When cell counter 435 reaches a preset value, represented in FIG. 4 as N, counter 435 sends a completion signal to control circuit 410.

During this operation, VCO 440 generates the receiver system clock according to a voltage generated by digital-to-analog converter (DAC) 445. Together, VCO 440 and DAC 445 form an NCO.

A divider circuit 450 divides the system clock by a constant, shown as p, to reduce VCO 440's frequency to a nominal $(m/n)*f_{source}$. Interarrival Time Counter 455 counts the output of divider circuit 450 to measure interarrival times.

When control circuit 410 receives the completion signal from counter 435, it signals counter 455 to transfer to buffer 460 its count of the number of VCO 440 clock pulses (divided by p) between N cell arrivals on the VC indicated by the value in VPI/VCI matching register 425. Control circuit 410 then resets counters 435 and 455 and sends an interrupt to microprocessor 430.

In response, microprocessor 430 reads buffer register 460 and implements loop filtering and any nonlinear processing necessary to ensure a smooth operation by eliminating sudden or singular changes. The result of the processing is a new value that microprocessor 430 sends to DAC 445 to set VCO 440's frequency.

To prevent error from lost cells, control circuit 410 can also direct VPI/VCI extraction circuit 415 to extract from a cell's header the sequence number in the ATM adaptation layer if used. Then, either control circuit 410 or microprocessor 430 can determine whether each cell is received in the proper sequence. If cells are lost, they would not be in the proper sequence and the results of the processing on that cell should not be used to adjust the VCO.

Figure 5:
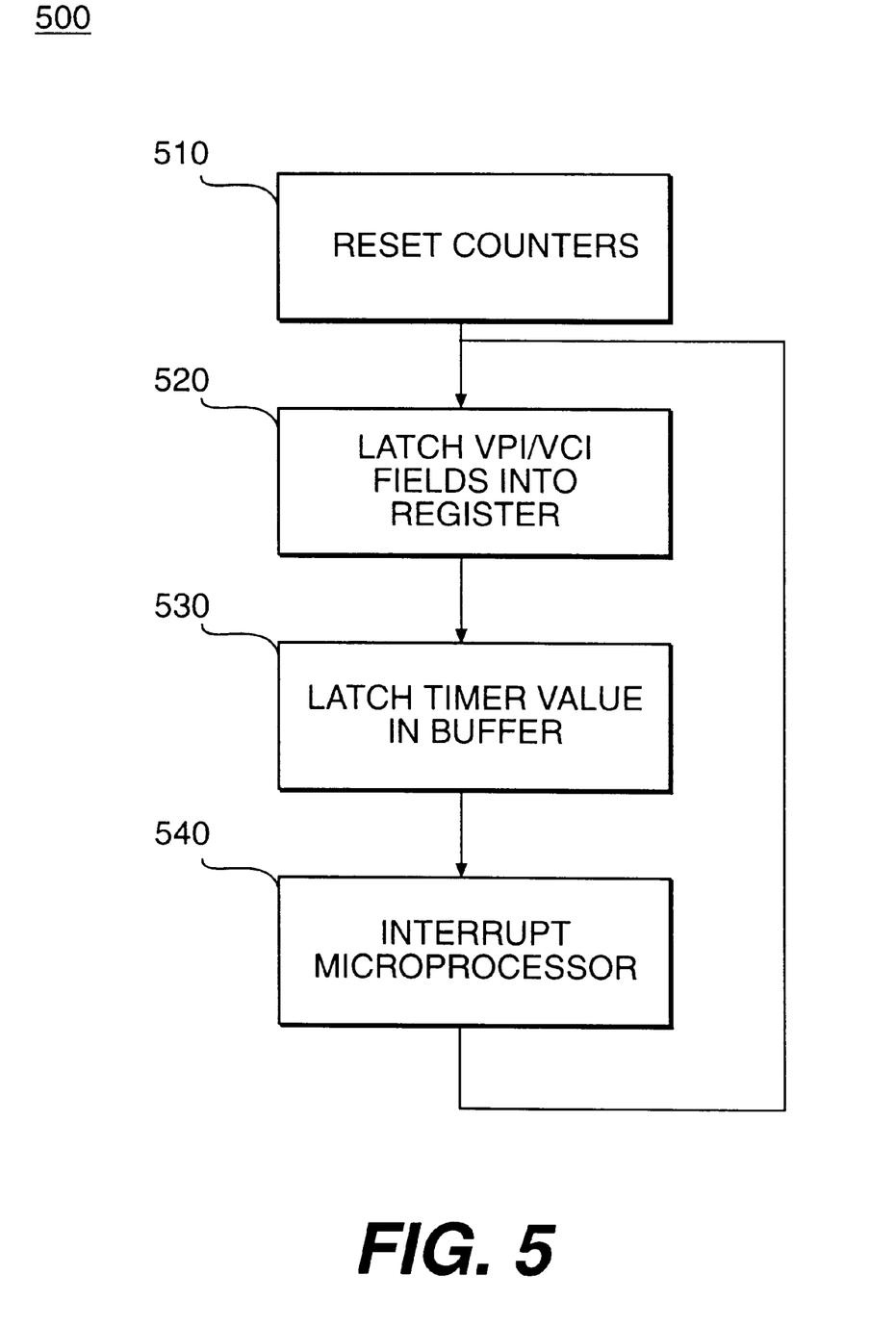
FIG. 5 is a flowchart of the steps performed by the control circuit in the timing section of FIG. 4.

Control circuit 410, which can be a programmable processor, dedicated circuitry, a state machine, or any other equivalent structure, performs several functions represented by the flowchart 500 in FIG. 5. Upon receiving a reset signal from the microprocessor 430, control circuit 410 resets cell counter 435 and Interarrival Time Counter 455 (step 510). Then, on receipt of the SOC signal from the PHY and ATM level circuitry 405, control circuit 410 latches the VPI/VCI fields from the ATM cell header into VPI/VCI extraction register 415 (step 520). When the VPI/VCI values in registers 415 and 425 first match, control circuitry 410 enables Interarrival Time Counter 455, but cell counter 435 does not begin to count. Cell counter 435 increments with each additional VPI/VCI match until counter 435 reaches N. This operation ensures that cell counter 435 reaches N after receiving N interarrival times.

At that point control circuit 410 latches the value of Interarrival Time Counter 455 into buffer 460 (step 530), asynchronously resets Interarrival Time Counter 455 and cell counter 435, and interrupts microprocessor 430 to let it know a value is available in buffer 460 (step 540).

Both Interarrival Time Counter 455 and cell counter 435 are enabled for counting immediately following reset. Also, for ongoing operation, steps 520–540 repeat.

Figure 6:
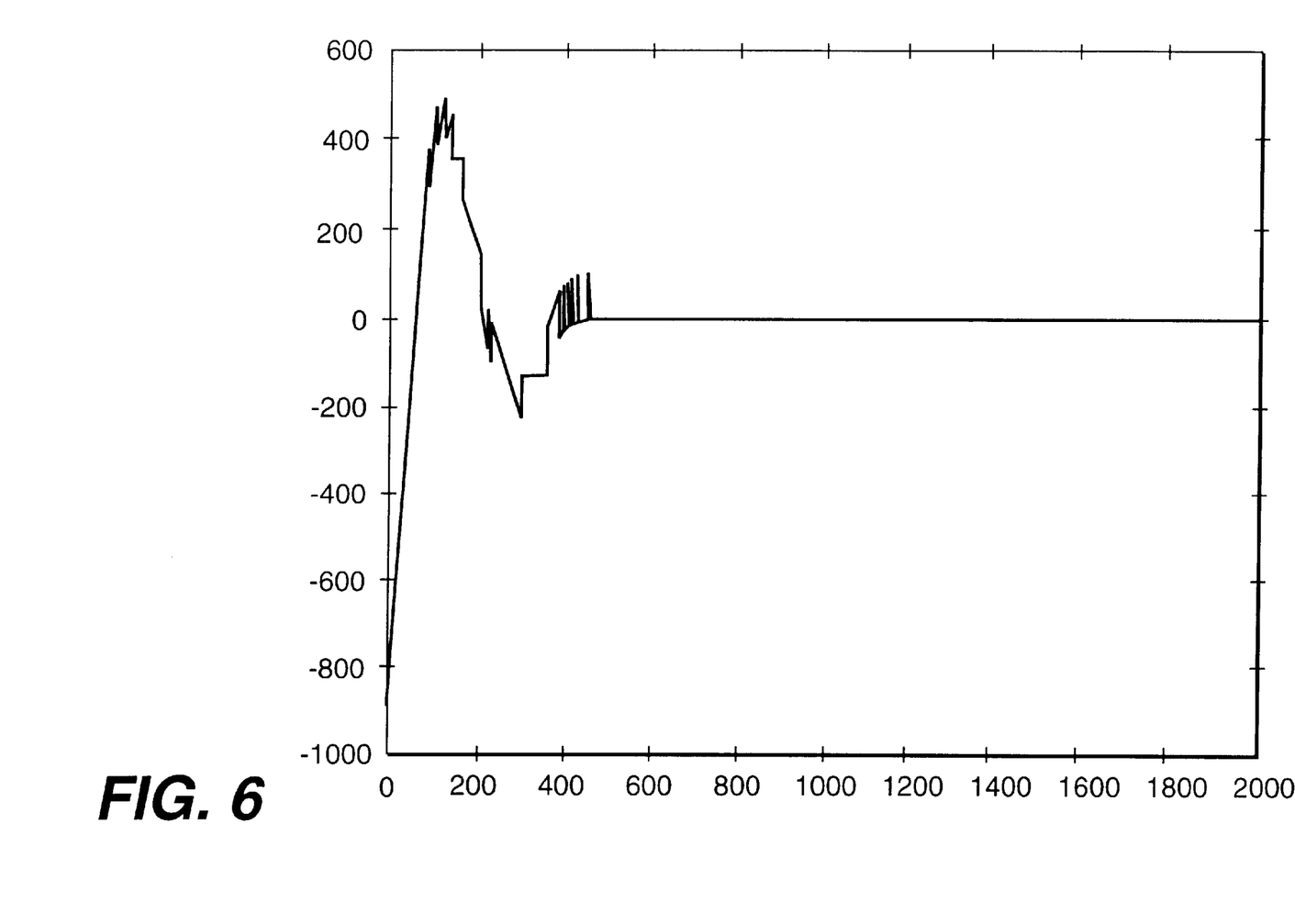
FIG. 6 is a frequency vs. time a graph from a simulation of timing recovery method consistent with this invention.
Figure 7:
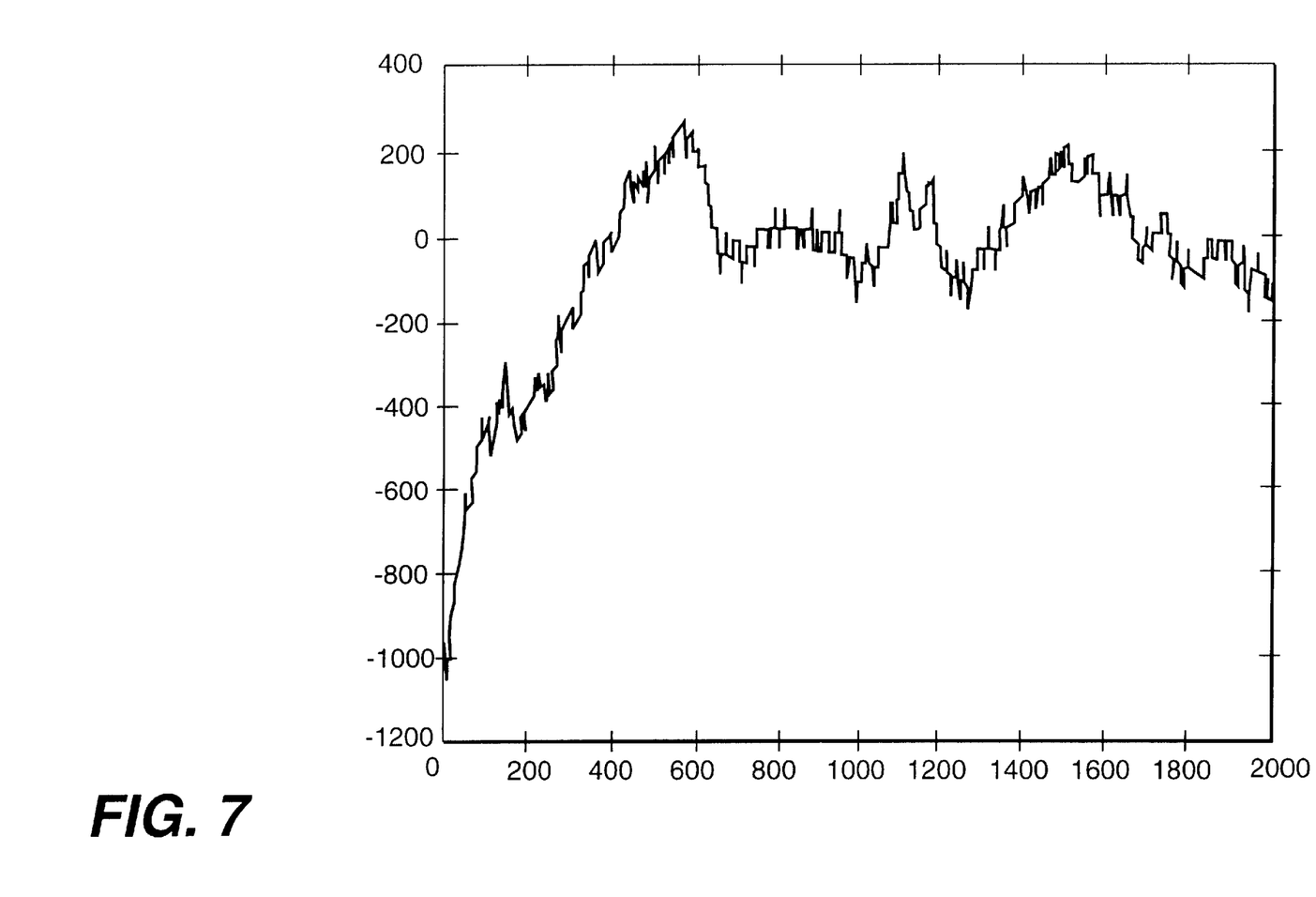
FIG. 7 is a frequency vs. time a graph from another simulation of timing recovery method consistent with this invention.

FIGS. 6 and 7 show graphs of frequency vs. time for simulations of a timing recovery method according to this invention. The loop parameters for the simulation represented by FIG. 6 were set for very fast frequency capture in a noiseless (i.e., no cell delay variation or CDV) environment, and shows the loop rapidly pulling in the frequency from a −1000 Hz frequency offset. The simulation represented by FIG. 7 shows the loop with somewhat relaxed parameters, pulling in from a −1000 Hz frequency offset in the presence of noise (i. e., CDV).

This invention has several advantages over conventional methods that rely on buffer level fill. For example, buffer underflows or overflows do not affect the clock recovery mechanism. Also, unlike the buffer fill level, cell interarrival time is directly related to the transmission frequency. For low CDV, this invention's inherent higher accuracy permits faster timing acquisition.

There are other advantages as well. For example, as explained above, cell loss can drive a FIFO fill-level-based method off track due to a constantly lower cell fill level. The present invention can easily compensate for the effects of lost cells. In addition, FIFO fill-level-based circuits must buffer a number of cells to operate accurately, but the time required for such causes extra delays. The present invention does not suffer that disadvantage.

Persons of ordinary skill will appreciate how to make modifications and variations to the preferred implementation without departing from the spirit and scope of the invention. For example, the transmission system does not need to be an ATM system, and the digital circuitry in FIG. 3 can be implemented in ASICs, PALs, or programmable logic devices. Also, for certain networks, signals other than the VPI/VCI values can be used.

This description is intended for proposed illustration and description, and does not contain an exhaustive description of embodiments or limit the invention to the precise form disclosed. One of ordinary skill may modify and vary the invention in light of the above teachings. The scope of the invention is defined by the appended claims and their equivalents.

What is claimed is:

1. A method of recovering the timing from an asynchronous stream composed of cells transmitted at a relatively constant bit rate comprising the steps of:

detecting, at a receiver, the receipt of a predetermined number of cells;

measuring an internal receiver time elapsed during the receipt of the predetermined number of cells, the internal receiver time being derived from a timing source in the receiver; and adjusting the timing source according to the measured internal receiver time.

2. The method of claim 1 further including the step of determining an average cell interarrival time for the detected cells from the measured internal receiver time; and wherein step of adjusting the system timing includes the substep of adjusting the system timing according to the average cell interarrival time.

3. The method of claim 2 wherein the step of determining an average cell interarrival time includes the substeps of detecting the arrival of a new cell, and incrementing a cell count upon the detection of the arrival of a new cell.

4. The method of claim 3 wherein the substep of incrementing a cell count includes the substep of generating a count signal when the cell count reaches a predetermined amount; and wherein the step of measuring the internal receiver time includes the substep of receiving the count signal, and recording the internal receiver time elapsed when the count signal is received.

5. A method of recovering the timing of an Asynchronous Transfer Mode (ATM) stream composed of ATM cells comprising the steps of:

detecting, at a receiver, the receipt of a predetermined number of proper ATM cells;

measuring an internal receiver time elapsed during the receipt of the predetermined number of ATM cells, the internal receiver time being derived from a timing source in the receiver; and adjusting the timing source according to the measured internal receiver time.

6. The method of claim 5 further including the step of determining an average cell interarrival time for the detected ATM cells from the measured internal receiver time; and wherein step of adjusting the system timing includes the substep of adjusting the system timing according to the average cell interarrival time.

7. The method of claim 5 wherein the step of detecting the receipt of a predetermined number cells includes the substeps of extracting a VPI/VCI value from a current one of the ATM cells;

examining the extracted VPI/VCI value to determine whether the current ATM cell is a proper ATM cell.

8. The method of claim 7 wherein the substep of examining the VPI/VCI includes the substeps of storing into a VPI/VCI register a value corresponding to a desired type of cell, and incrementing a cell count when the contents of the extracted VPI/VCI register equal the VPI/VCI values.

9. The method of claim 8 wherein the substep of incrementing a cell count includes the substep of generating a count signal when the cell count reaches a predetermined amount; and wherein the step of measuring the internal receiver time includes the substeps of receiving the count signal, and recording the internal receiver time elapsed when the count signal is received.

10. A method of sending an asynchronous stream composed of cells comprising the steps of:

transmitting the stream at a relatively constant bit rate;

receiving the stream at a receiver;

detecting, at the receiver, the receipt of a predetermined number of cells;

measuring an internal receiver time elapsed during the receipt of the predetermined number of cells, the internal receiver time being derived from a timing source in the receiver; and adjusting the timing source according to the measured internal receiver time.

11. The method of claim 10 further including the step of determining an average cell interarrival time for the detected cells from the measured internal receiver time; and wherein step of adjusting the system timing includes the substep of adjusting the system timing according to the average cell interarrival time.

12. The method of claim 11 wherein the step of determining an average cell interarrival time includes the substeps of detecting the arrival of a new cell, and incrementing a cell count upon the detection of the arrival of a new cell.

13. The method of claim 12 wherein the substep of incrementing a cell count includes the substep of generating a count signal when the cell count reaches a predetermined amount; and wherein the step of measuring the internal receiver time includes the substep of receiving the count signal, and recording the internal receiver time elapsed when the count signal is received.

14. A method of sending an Asynchronous Transfer Mode (ATM) stream composed of ATM cells comprising the steps of:

transmitting the stream at a relatively constant bit rate;

receiving the stream at a receiver;

detecting, at the receiver, the receipt of a predetermined number of proper ATM cells;

measuring an internal receiver time elapsed during the receipt of the predetermined number of ATM cells, the internal receiver time being derived from a timing source in the receiver; and adjusting the timing source according to the measured internal receiver time.

15. The method of claim 14 further including the step of determining an average cell interarrival time for the detected ATM cells from the measured internal receiver time; and wherein step of adjusting the system timing includes the substep of adjusting the system timing according to the average cell interarrival time.

16. The method of claim 14 wherein the step of detecting the receipt of a predetermined number cells includes the substeps of extracting a VPI/VCI value from a current one of the ATM cells;

examining the extracted VPI/VCI value to determine whether the current ATM cell is a proper ATM cell.

17. The method of claim 16 wherein the substep of examining the VPI/VCI includes the substeps of storing into a VPI/VCI register a value corresponding to a desired type of cell;

incrementing a cell count when the contents of the VPI/VCI register equal the extracted VPI/VCI values.

18. The method of claim 17 wherein the substep of incrementing a cell count includes the substep of generating a count signal when the cell count reaches a predetermined amount; and wherein the step of measuring the internal receiver time includes the substeps of receiving the count signal, and recording the internal receiver time elapsed when the count signal is received.

19. A system in a receiver to recover the timing of a stream composed of cells sent at a relatively constant bit rate comprising:

monitor means for detecting the receipt of a predetermined number of cells;

an internal receiver clock recording internal receiver time;

timer means for measuring the internal receiver time elapsed during the receipt of the predetermined number of cells; and correction means for adjusting the internal receiver clock according to the measured internal receiver time.

20. The system of claim 19 wherein the internal receiver clock is a voltage-controlled oscillator, and wherein the correction means includes a digital-to-analog converter generating a feedback voltage signal for the voltage-controlled oscillator.

21. The system of claim 20 wherein the internal receiver clock includes a clock signal divider, coupled to an output of the voltage-controlled oscillator, to generate pulses at a lower frequency than the voltage-controlled oscillator, and wherein the timer means includes a counter to count the pulses generated by the clock signal divider.

22. The system of claim 20 wherein the correction means includes means for determining an average cell interarrival time for the detected cells from the measured internal receiver times, and means for adjusting the internal receiver clock according to the average cell interarrival time.

23. A system in a receiver to recover the timing of a stream composed of cells sent at a relatively constant bit rate comprising:

monitor means for detecting the receipt of a predetermined number of ATM cells;

an internal receiver clock recording internal receiver time;

timer means for measuring the internal receiver time elapsed during the receipt of the predetermined number of ATM cells; and correction means for adjusting the internal receiver clock according to the measured internal receiver time.

24. The system of claim 23 wherein the internal receiver clock is a voltage-controlled oscillator, and wherein the correction means includes a digital-to-analog converter generating a feedback voltage signal for the voltage-controlled oscillator.

25. The system of claim 24 wherein the internal receiver clock includes a clock signal divider, coupled to an output of the voltage-controlled oscillator, to generate pulses at a lower frequency than the voltage-controlled oscillator; and wherein the timer means includes a counter to count the pulses generated by the clock signal divider.

26. The system of claim 24 wherein the correction means includes means for determining an average cell interarrival time for the detected ATM cells from the measured internal receiver time; and means for adjusting the internal receiver clock according to the average cell interarrival time.

27. The system of claim 23 wherein the monitor means includes a network extraction circuit for extracting from the cells data corresponding to the ATM layer;

a VPI/VCI extraction register, coupled to the network extraction circuit, for storing current VPI/VCI value in the cells; and a comparator, coupled to the VPI/VCI extraction register, for examining the current VPI/VCI values to determine the receipt of a proper ATM cell.

28. The system of claim 27 wherein the monitor means further includes a VPI/VCI matching register, coupled to the comparator circuit and containing the values of the cell header predetermined to be proper.

29. The system of claim 28 wherein the comparator includes means for generating a cell signal indicating the receipt of a proper new cell; and wherein the monitor means further includes a cell counter, coupled to receive the cell signal from the comparator, configured to increment a cell count upon receipt of the cell signal and generate a count signal when the cell count reaches a predetermined amount.

30. The system of claim 29 wherein the means for measuring the internal receiver time elapsed during the receipt of the predetermined number of ATM cells includes a counter to count the internal receiver time and stop upon receipt of a count signal.

31. A receiver receiving a plurality of cells intended to be transmitted at a constant bit rate, the receiver comprising:

a receiving section to buffer the contents of the cells;

a processing section, coupled to the receiving section, to process the cells; and a timing section to generate an internal timing signal for the receiving section and the processing section, the timing section including means for detecting the receipt of a predetermined number of cells;
an internal receiver clock generating the internal timing signal;
means, coupled to the internal timing signal for measuring the internal receiver time elapsed during the receipt of the predetermined number of cells; and
correction means for adjusting the internal receiver clock according to the measured internal receiver time.

32. A receiver receiving a plurality of ATM cells intended to be transmitted at a constant bit rate, the receiver comprising:

a receiving section to buffer the contents of the ATM cells;
a processing section, coupled to the receiving section, to process the ATM cells; and
a timing section to generate an internal timing signal for the receiving section and the processing section, the timing section including
means for detecting the receipt of a predetermined number of ATM cells;
an internal receiver clock generating the internal timing signal;
means, coupled to the internal timing signal for measuring the internal receiver time elapsed during the receipt of the predetermined number of ATM cells; and
monitor means for adjusting the internal receiver clock according to the measured internal receiver time.

33. A system for transmitting a plurality of cells comprising:

a transmitter sending the cells at a relatively constant bit rate; and
a receiver, receiving the cells and including
a receiving section to buffer the contents of the cells,
a processing section, coupled to the receiving section, to process the cells, and
a timing section to generate an internal timing signal for the receiving section and the processing section, the timing section including
means for detecting the receipt of a predetermined number of cells;
an internal receiver clock generating the internal timing signal;
means, coupled to the internal timing signal for measuring the internal receiver time elapsed during the receipt of the predetermined number of cells; and
monitor means for adjusting the internal receiver clock according to the measured internal receiver time.

34. A system for transmitting a plurality of ATM cells comprising:

a transmitter sending the ATM cells at a relatively constant bit rate; and
a receiver, receiving the ATM cells and including
a receiving section to buffer the contents of the ATM cells,
a processing section, coupled to the receiving section, to process the ATM cells, and
a timing section to generate an internal timing signal for the receiving section and the processing section, the timing section including
means for detecting the receipt of a predetermined number of ATM cells;
an internal receiver clock generating the internal timing signal;
means, coupled to the internal timing signal for measuring the internal receiver time elapsed during the receipt of the predetermined number of ATM cells; and
monitor means for adjusting the internal receiver clock according to the measured internal receiver time.

* * * * *